(12) United States Patent
Wells et al.

(10) Patent No.: US 7,729,959 B1
(45) Date of Patent: Jun. 1, 2010

(54) WEB-BASED ENTRY OF FINANCIAL TRANSACTION INFORMATION AND SUBSEQUENT DOWNLOAD OF SUCH INFORMATION

(75) Inventors: Michael L. Wells, New York, NY (US); Joseph W. Wells, San Carlos, CA (US)

(73) Assignee: Intuit Inc., Mountain View, CA (US)

( * ) Notice: Subject to any disclaimer, the term of this patent is extended or adjusted under 35 U.S.C. 154(b) by 831 days.

(21) Appl. No.: 10/105,602

(22) Filed: Mar. 21, 2002

Related U.S. Application Data

(63) Continuation of application No. 09/390,138, filed on Sep. 3, 1999, now Pat. No. 6,446,048.

(51) Int. Cl.
*G07B 17/00* (2006.01)

(52) U.S. Cl. .................................................. 705/30

(58) Field of Classification Search ............... 705/26, 705/34, 35, 40, 42, 30
See application file for complete search history.

(56) References Cited

U.S. PATENT DOCUMENTS

| | | | |
|---|---|---|---|
| 4,645,873 A | 2/1987 | Chomet | 379/93 |
| 4,866,611 A | 9/1989 | Cree et al. | 364/300 |
| 5,134,564 A | 7/1992 | Dunn et al. | 364/406 |
| 5,220,501 A | 6/1993 | Lawlor et al. | 364/408 |
| 5,231,571 A | 7/1993 | D'Agostino | 364/408 |
| 5,351,296 A | 9/1994 | Sullivan | 380/24 |
| 5,383,113 A | 1/1995 | Kight et al. | 364/401 |
| 5,581,764 A | 12/1996 | Fitzgerald et al. | 395/703 |
| 5,649,115 A | 7/1997 | Schrader et al. | 395/233 |
| 5,684,990 A | 11/1997 | Boothby | 395/616 |
| 5,699,528 A | 12/1997 | Hogan | 395/240 |
| 5,715,397 A | 2/1998 | Ogawa et al. | 395/200.18 |
| 5,842,185 A | 11/1998 | Chancey et al. | 705/40 |
| 5,842,211 A | 11/1998 | Horadan et al. | 707/10 |
| 5,845,293 A * | 12/1998 | Veghte et al. | 707/202 |

(Continued)

FOREIGN PATENT DOCUMENTS

EP          0 855 687 A2         7/1998

OTHER PUBLICATIONS

Weverka, Peter. Microsoft Money 98 for Dummies. IDG Books Worldwide. Foster City, California. 1997. pp. 16, 22-26, 35, 60-62, 70, 109, 128, 276-278.*

(Continued)

*Primary Examiner*—Jason M Borlinghaus
(74) *Attorney, Agent, or Firm*—Osha • Liang LLP

(57) ABSTRACT

The systems, methods and related software products which enable users to temporarily store and subsequently retrieve information are disclosed. The system includes a plurality of input devices, client computers (each having a user-specific personal finance application) and a web-site server with a database. The input devices, client computers and server are communicatively linked via a communication network so that a plurality of users can temporarily store and/or manipulate financial transaction information on the server from any of the input devices. Each user can also transmit financial profile information to the server. This information enables the server to replicate the unique profile characteristics for each of the finance applications. This, in turn, simplifies remote entry of information, subsequent download of that information and integration of such information into each user's personal finance application.

17 Claims, 9 Drawing Sheets

U.S. PATENT DOCUMENTS

| | | | | |
|---|---|---|---|---|
| 5,875,296 | A | | 2/1999 | Shi et al. ............... 395/188.01 |
| 5,880,446 | A | | 3/1999 | Mori et al. .................. 235/380 |
| 5,884,312 | A | | 3/1999 | Dustan et al. ................. 707/10 |
| 5,884,325 | A | | 3/1999 | Bauer et al. ................. 707/201 |
| 5,890,140 | A | | 3/1999 | Clark et al. ................... 705/35 |
| 5,903,881 | A | | 5/1999 | Schrader et al. ............... 705/42 |
| 5,913,202 | A | | 6/1999 | Montoyama ................ 705/35 |
| 5,920,848 | A | | 7/1999 | Schutzer et al. ............... 705/42 |
| 5,928,329 | A | | 7/1999 | Clark et al. ................. 709/227 |
| 5,933,816 | A | | 8/1999 | Zeanah et al. ................. 705/35 |
| 5,945,653 | A | | 8/1999 | Walker et al. ............... 235/380 |
| 5,953,406 | A | | 9/1999 | LaRue et al. ................ 379/265 |
| 5,960,411 | A | | 9/1999 | Hartman et al. ............... 705/26 |
| 6,047,268 | A | * | 4/2000 | Bartoli et al. .................. 705/35 |
| 6,070,150 | A | | 5/2000 | Remington et al. ........... 705/34 |
| 6,128,602 | A | * | 10/2000 | Northington et al. .......... 705/35 |
| 6,128,603 | A | | 10/2000 | Dent et al. .................... 705/40 |
| 6,131,096 | A | * | 10/2000 | Ng et al. ....................... 707/10 |
| 6,154,729 | A | | 11/2000 | Cannon et al. ................. 705/35 |
| 6,226,650 | B1 | * | 5/2001 | Mahajan et al. ............. 707/201 |

OTHER PUBLICATIONS

Pravica, Danica. Centralized systems help reduce risks. Computing Canada. Willowdale. vol. 25, iss. 30. Aug. 13, 1999. pp. 23-24.*

Stallings, William & Van Slyke, Richard. Business Data Communications 3rd Edition. Prentice Hall. Upper Saddle River, NJ. 1998. pp. 44-45.*

MobiNetix Systems Debuts eReceipts. Business Wire. New York City, NY. Jun. 7, 1999. p. 1.*

Turban, Efraim, McLean, Ephraim & Wetherbee, James. Information Technology for Management: Improving Quality & Production. John Wiley & Sons. 1996. pp. 621-622.*

Adhikari, Richard. Net storage services on the rise. Information Week. Manhasset. iss. 581. May 27, 1996. p. 42.*

Weverka, Peter. Microsoft Money '98 for Dummies. IDG Books Worldwide. 1997. pp. 21-33; 109-145.*

Miller, Philip. TCP/IP Explained. Butterworth-Heinemann. 1997. pp. 84-85; 100-101; 117.*

Kent, Allen; Williams, James G. Encyclopedia of Computer Science & Technology: vol. 30. CRC Press. 1994. pp. 296-297.*

No author listed, "Letter Customers Have It Their Way," *U.S. Banker*, Nov. 1997, pp. 3-8.

No author listed, "Getting the Lead Out of Remote Banking," *U.S. Banker*, Nov. 1997, pp. 9-15.

No author listed, "Luring Customers With Bill Pay," *U.S. Banker*, Nov. 1997, pp. 16-20.

Bates, Robert, "Conn. Bank Quenches Customers' On-Line Thirst," *Bank Systems & Technology*, vol. 35, No. 9 (Sep. 1998): 50.

Delis, Alex, "Techniques for Update Handling in the Enhanced Client-Server DBMS," *IEEE Transactions on Knowledge and Data Engineering*, vol. 10, No. 3 (May/Jun. 1998), pp. 458-476.

Dratva, Rrichard, "WWW-Based Home Banking Services In Switzerland: A Case Study," *Computer Networks and ISDN Systems 28* (1995), pp. 199-208.

Furash, Edward, "Internet Strategy: Why Banks May Be Getting It Wrong—And How to Get It Right," *Journal of Retail Banking Services*, vol. XXI, No. 2 (Summer 1999), pp. 37-42.

Gray, Lori, "Ohio Savings Bank Leapfrogs Big Competitors with Internet Leadership," *Journal of Retail Banking Services*, vol. XXI, No. 2 (Summer 1999), pp. 15-18.

Leong, S. K. et al., "An Internet Application for On-Line Banking," *Computer Communications 20* (1998), pp. 1534-1540.

McChesney, Michael, "Banking in Cyberspace: An Investment in Itself," *IEEE Spectrum* (Feb. 1997), pp. 54-59.

Mahajan, Sameer et al., "Grouping Techniques for Update Propagation in Intermittently Connected Databases," *14th International Conference on Data Engineering* (Feb. 23-27, 1998), pp. 46-53.

Orenstein, Alison F., "First Tennessee Adds 'Push' to Home Banking," *Bank Systems & Technology*, vol. 35, No. 5 (May 1998): 18.

Orenstein, Alison F., "Citibank Makes All-Out Push for Home Banking, Yet Questions Loom On Customer Demand," *Bank Systems & Technology*, vol. 35, No. 9 (Sep. 1998): 10.

Orr, Bill, "Community Bank Guide To Internet Banking," *ABA Banking Journal*, vol. 90, No. 6 (Jun. 1998): 47-53+.

Orr, Bill, "Netcentric Computing: What Does It Mean for Banking?" *ABA Banking Journal*, vol. 88, No. 3 (Mar. 1996): 74.

Pavia, Jim, "FirstBank Northwest Readies Direct Banking," *Bank Systems & Technology*, vol. 35, No. 4 (Apr. 1998): 58.

Redman, Russell, "Suffolk County National Outfits for the Web," *Bank Systems & Technology*, vol. 35, No. 10 (Oct. 1998):70.

Swanick, Patrick et al., "Key2Your$+Internet—How KeyCorp Integrates All Delivery Channels," *Journal of Retail Banking Services*, vol. XXI, No. 2 (Summer 1999), pp. 7-13.

Terry, Susan, "First Tennessee's FTB Online Plies the Internet to Become Customers' Trusted Financial Advisor," *Journal of Retail Banking Services*, vol. XXI, No. 1, (Spring 1999), pp. 7-13.

Underwood, George et al., "User-Centered Push for Timely Information Delivery," *Computer Networks and ISDN Systems 30* (1998), pp. 33-40.

Quicken Deluxe 98 Software on CD-ROM with associated manual. "Getting More From Your Money," cover, pp. 5-18 and 73-76, and "QuickStart" guide (1997) (collectively P/N 250027).

Web-site pages from Microsoft.com/money/last updated Sep. 1, 1999.

* cited by examiner

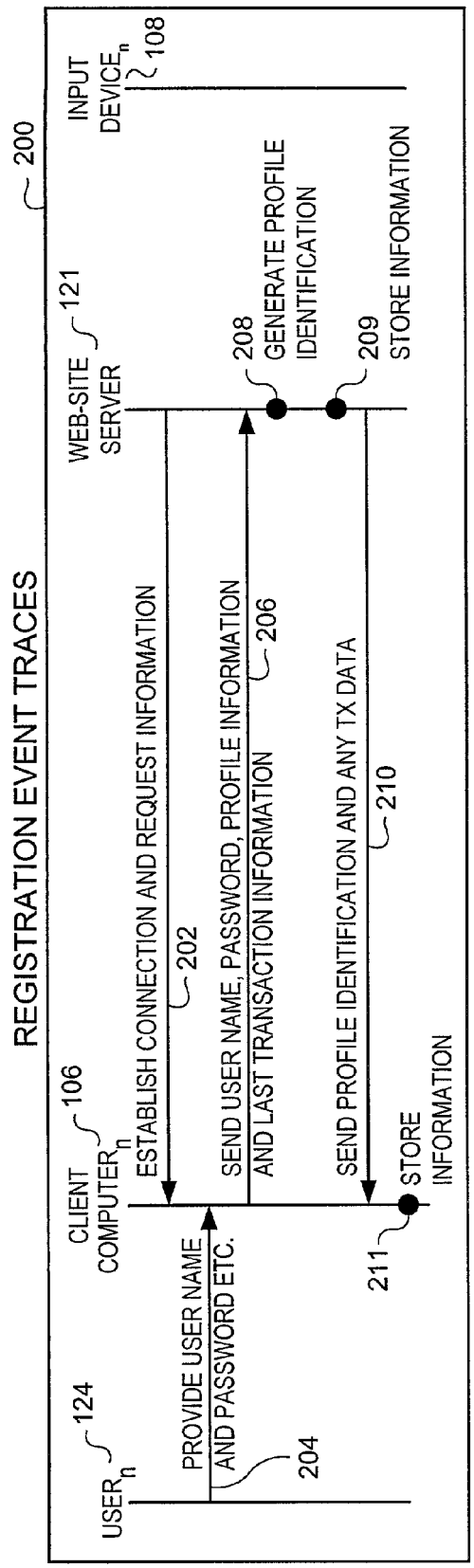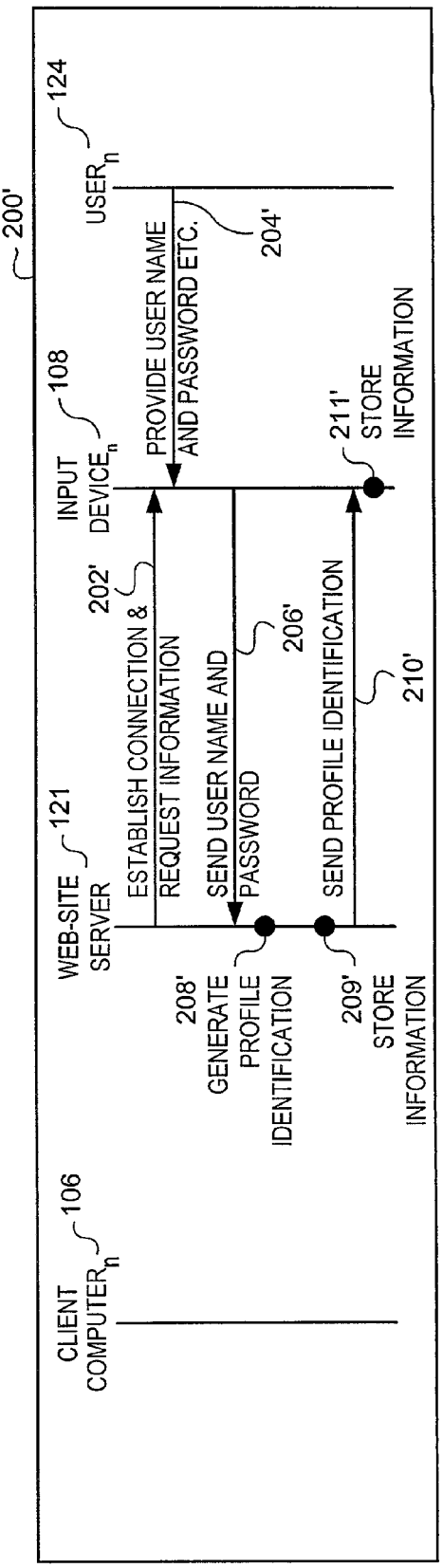

400

(!) Click here for help on downloading transactions into Quicken.
You currently have 3 pending transaction(s) for download.

401

Enter new transactions into Quicken

QUICKEN ACCOUNT — 404
CHECKING

TYPE — 406
Deposit ▼

DATE — 408
08/09/1999

PAYEE — 410
BANK OF COLUMBIA

AMOUNT — 412
$ 163.77

CHECK # — 414

CATEGORY — 416
HOME OFFICE

MEMO — 418
POCKET CHANGE

419 — [ Enter Transaction ]   420 — [ Clear Form ]

402
403

Review WebEntry transactions

432 →
08/09/1999 SAVINGS  BANK OF COLUMBIA            $10,963.77
            HOME OFFICE   PROCEEDS FROM        Deposit
       ←438      440→     JINE ACCOUNT
STATUS: Not Downloaded  Delete  Edit ↙— 442

434 →
08/09/1999 CHECKING  UNCLE SAM                  $0.31
       6250         TAXES     VOTE REPUBLICAN   Payment
       ←438'     440→         IN THE FUTURE
STATUS: Not Downloaded  Delete  Edit ↙— 442

436 →
08/09/1999 CHECKING  MICROSOFT INC.             $7,995.00
       6251         HOME OFFICE  MISC. SOFTWARE  Payment
       ←438"    440→
STATUS: Not Downloaded  Delete  Edit ↙— 442

Remove my categories, accounts, and classes from the Web ↙— 444

FIG. 4a

WEB-BASED ENTRY OF FINANCIAL TRANSACTION INFORMATION AND SUBSEQUENT DOWNLOAD OF SUCH INFORMATION

CROSS-REFERENCE TO RELATED APPLICATION

This application is a continuation of application Ser. No. 09/390,138, entitled "Web-Based Entry of Financial Transaction Information and Subsequent Download of Such Information," filed on Sep. 3, 1999, now U.S. Pat. No. 6,446,048 the subject matter of which is incorporated by its entirety herein.

BACKGROUND

1. Field of the Invention

The present invention relates to the exchange of financial information over a global communication network. More particularly, the invention relates to centrally storing financial information received from mobile users and subsequently providing that information back to the respective users so that it can be integrated into the users' personal finance software.

2. Description of the Related Art

Computer-based record keeping of financial information by individuals has been extremely popular in recent years. With improvements in, and the wide-spread increase in the popularity of, personal computers, more and more individuals have begun using home desktop computers to compile their financial records. Today, software packages for use on personal computers allow users to track their investments and loans, bank and pay bills online, monitor expenditures, create detailed financial reports and prepare tax returns. One such personal finance application is Quicken® deluxe 98 manufactured and sold by Intuit, Inc. of Mountain View, Calif. The various features of this software package are fully described in the software user's manual entitled "Getting More from Your Money," $2^{nd}$ printing (Intuit part number 250036) published in October 1998, the entire contents of which are hereby incorporated by reference.

The use of personal finance software has enabled users to more effectively control their finances which, naturally, leads to more efficient utilization of personal resources. For example, by monitoring monthly expenditures on dining, automobile-related expenses, utilities and/or healthcare, individuals are now, more than ever, capable of controlling such expenses. Moreover, individuals using personal finance software are more capable of predicting their financial obligations well into the future. Accordingly, individuals can now better predict whether they have the financial wherewithal to fulfill the obligations associated with potential financial transactions. These and other benefits of using personal finance software on home computers has yielded a virtual revolution in the ability of individuals to control their personal finances.

A number of deficiencies associated with such personal finance applications, however, arise from the facts that most personal finance applications are customizable and are resident on personal computers that remain stationary in the user's home. Generally, a user defines a particular financial profile (i.e., the personalized set of values selected to, at least in part, define a user's own financial model) when using a personal finance application. This financial profile describes the user's financial relationships and obligations, assets and other modalities by which the user creates or describes financial transactions. By way of example only, one financial profile parameter may describe the types of accounts utilized by an individual. Some of the possible values for the account parameter may include a checking account, a savings account, a credit card account, a money market account, a liability account, a bills/payables account, an asset account, an invoice/receivables account, a cash account, etc. Numerous other examples of financial profile parameters and parameter values are disclosed herein and others will readily occur to those of skill in the art.

While the above-discussed attributes of personal finance software packages offer many advantages to users, they also virtually inescapably lead to the limitation that, in order to input financial transaction information, a given user must have access to the computer in the user's home. In part, this is because, once customized, the financial profile of each user's personal finance application is unique. For example, each profile may include a different set of accounts, categories and, often, classes to permit the user to more efficiently organize transactions. Similarly, each value in each set of accounts, categories and classes can have a user-specified name. Moreover, insofar as a given personal finance application will, at any point in time, contain an accumulated amount of previously inputted financial information, users cannot practically utilize personal finance applications other than their own. Accordingly, a user who wishes to use a personal finance application must, as a practical matter, return to the same computer each time new transaction information is to be added to the application.

This deficiency leads to the possibility that delays in entering information will yield errors in the inputted transaction information, or worse, will lead to omissions to enter such information entirely. For example, a user on a day-long shopping trip will typically purchase items at a number of different stores, stop for gasoline and dine out twice before returning home. When the user finally gets the opportunity to access the user's personal computer to enter the transaction information for the day, the user may have forgotten some details of a given transaction or may have entirely forgotten about some transactions. Such errors may not be corrected, if at all, until much later. Therefore, such errors will skew all further financial analyses and reports which rely on the integrity of the information entered into the personal finance software.

Deficiencies of the general nature discussed above, are particularly acute when the user is away from home for an extended period of time such as while on a vacation or business trip. In cases such as this, when a user's personal computer may be inaccessible for weeks on end, the likelihood of compromising the integrity of the user's financial records increases markedly. For example, a week-long vacation easily could result in dozens of financial transactions totaling thousands of dollars. Obviously, significant delays in recording such transactions can have a substantial impact on the quality of the information subsequently entered into and retrieved from a personal finance application.

Attempts have been made to reduce the chance of erroneous entries being made in personal finance applications by increasing the timeliness with which transactions are recorded. For example, the advent of personal digital assistants ("PDA"), such as the Palm Pilot® made by 3Com, Inc. of Milpitas, Calif., can now be used to promptly record personal financial transactions as long as a user has a PDA at the time of a given transaction. In particular, personal finance software designed to integrate with, and to complement, companion software on a home-based personal computer is now available for PDAs. With a PDA and such software, a user simply enters financial transaction information on the PDA and, upon returning home, downloads the recorded transactions into the user's personal computer. Since such PDA software products are compatible with the desktop version of the personal finance software, they enable users to capture checking, credit card and cash transactions while on the road. Naturally, such systems have increased the accuracy of personal financial record keeping.

The use of PDAs, however, has not entirely solved the problems of erroneous and/or omitted entries because, for example, there are a significant number of individuals who do not have PDAs. Thus, individuals who dislike PDAs and/or who are unwilling to bear the often significant expense of purchasing and using a PDA continue to be plagued by the above-described deficiencies. Moreover, attempts to enter financial transactions on a PDA can be thwarted if a user inadvertently leaves the user's PDA at home or if the user's PDA is damaged in some way.

Therefore, there remains a need in the art for alternative systems, methods and related software products for recording personal financial transactions by individuals who do not have immediate access to their personal computers.

There remains an additional need in the art for alternative systems, methods and related software products which are capable of (1) temporarily storing financial information provided by a plurality of users while preserving the confidentiality of each user's information; and (2) permitting those users to subsequently retrieve the stored information so that it can be integrated into the user's personal finance software.

There remains yet another need in the art for alternative systems methods and related software products of the type described above which offer users an optimal combination of simplicity, reliability, efficiency and versatility.

SUMMARY OF THE INVENTION

The present invention satisfies the above needs, and overcomes the above-stated and other deficiencies of the prior art, by providing systems, web-sites, methods and related software products that enable users to temporarily store and subsequently retrieve financial transaction information in a simpler, more timely and more cost effective manner. Generally, the present invention makes these and other benefits possible by providing a central database (preferably coupled to a website) that is accessible via a communication network and that has the ability to receive financial transaction information from individual users, store such information and subsequently provide such information to the respective users. The particular manner in which the database stores and provides this financial information is defined by a number of financial profile parameters which are preferably supplied by the users. If the users advantageously specify these parameters, the transaction information may be easily integrated into each user's personal finance software resident on the user's personal computer. Alternatively, a predetermined and generic financial profile can be used by the database to assist information upload and subsequent download, there being a likelihood that any given user can effectively use the database financial profile. The present invention, thus, enables the users to upload financial information to the database from a wide variety of remote input devices, via the communication network, and subsequently permits the users to download and integrate that information into their respective personal finance applications.

The system embodiments of the present invention generally comprise a plurality of input devices, client computers (each having a user-specific personal finance application) and a web-site server with a database. The input devices, client computers and web-site server are communicatively linked via a communication network so that a plurality of users can temporarily store and/or manipulate financial transaction information on the server from any of the input devices. Each user can also transmit financial profile information to the server. In one embodiment, the profile describes a user's accounts and categories. It may also, optionally, describe a user's classes. The profile information enables the creation of financial profiles which correspond with the unique profiles of each user's financial application. This, in turn, simplifies remote entry of information, subsequent download of that information and integration of such information into each user's personal finance application. Therefore, when the user subsequently accesses a respective client computer having the user's customized personal finance application, the user can download the previously stored information and, at least partially automatically, integrate the information into the user's finance application.

Certain embodiments of the present invention take the form of a web-site for temporarily storing financial information belonging to a plurality of users so that the users can provide information to the web-site from respective first computers and so that users can subsequently retrieve that information from respective second computers which each have a personal finance application with a user-specific profile. In such embodiments, the web-site is accessible via a global communication network and includes a database which is communicatively linked to the communication network. The database can store financial information provided by the users and includes a plurality of, preferably user-specific, profiles. At least some of these profiles have a financial profile which corresponds to that of the profiles of respective personal finance applications.

Other embodiments of the present invention encompass methods of temporarily storing financial information, which is provided by a plurality of users so that the users can subsequently retrieve the financial information via a communication network. Generally speaking, these methods entail receiving identification and financial profile information via the communication network from any of the plural users, the identification information being user-identification and/or profile-identification information. Additionally, financial information to be temporarily stored is preferably received and associated with the identification and financial profile information so that, upon request, the financial information can be retrieved by the user. Finally, the financial information is then stored. In some embodiments, information retrieval requests can subsequently be received, via the communication network, from any of the plural users. If so, these method embodiments of the present invention entail distributing the requested financial information to the respective plural users.

Still other embodiments of the present invention are generally directed to methods of establishing a user-specific profile on a web-site which is accessible via a global communication network and which has an associated database for storing financial transaction information received from a plurality of users. Such methods comprise receiving identification information and financial profile information from the plurality of users via the communication network. Then the financial profile information is associated with the identification information and stored in the database. The database profile can then be periodically updated, for example, each time a user connects to the web-site.

One significant benefit offered by the present invention is a reduction in the probability that erroneous entries could be made in a user's personal finance application. One manner in which this benefit is realized is by increasing the timeliness with which financial information can be recorded. With the advent of the present invention, users no longer need to directly access their personal computers or PDAs in order to input financial transactions. Instead, users can record financial transactions from any of the nearly ubiquitous input devices, such as personal computers, which provide access to a communication network such as the Internet. In one embodiment of the invention, the information can even be automatically delivered from another web-site where a user has consummated a transaction. In this case, the possibility of human error is entirely eliminated and recordation occurs at least substantially, and preferably virtually, instantaneously.

The possibility of erroneous entries occurring is further reduced because the present invention offers the ability to input financial transaction information from remote input devices in the same manner as a given user would input such information on the user's own personal computer. More specifically, because the database preferably stores each user's account list, category list and class list, a user is able to store transaction information as easily as if they were entering the transaction into their personal finance application directly. Naturally, this feature reduces the possibility of erroneous entries because it reduces the possibility of confusion. Finally, the present invention reduces the possibility of erroneous entries even more effectively than the use of personal digital assistants (PDAs) in the related art. This is because the present invention does not require any additional physical equipment. Thus, the chance of a failure to input information because a PDA was forgotten or damaged is eliminated.

The present invention also offers the benefit of increased convenience for a number of reasons. First, unlike the use of PDAs, the present invention does not entail the burden of carrying additional equipment. Moreover, since the present invention is preferably able to store on the web-site a copy of the financial profile of each user's personal finance application, each user can quickly and easily store and retrieve information in a manner which is customary to each user. This feature also facilitates subsequent download of stored information and automatic integration of such information into the user's personal finance application. Finally, the skyrocketing popularity of personal computers and communication networks such as the Internet means that it is becoming more convenient to use the present invention with every day that passes.

Still another benefit offered by the present invention is that all of the above-discussed benefits are now available to users at virtually no additional expense. Unlike the above-discussed related art, the present invention does not require the purchase of any additional equipment such as a personal digital assistant. Moreover it is expected that in most circumstances users will be able to access an appropriate communication network at little cost, if any. This is in contrast to the Internet access fees customarily assessed to users of personal digital assistants. In short, the present invention is an improvement over the prior art in that it offers all of the benefits of storing financial transaction information on a personal digital assistant, without any of the associated deficiencies of such a system.

Numerous other advantages and features of the present invention will become apparent to those of ordinary skill in the art from the following detailed description of the invention, from the claims and from the accompanying drawings.

BRIEF DESCRIPTION OF THE DRAWINGS

The preferred embodiments of the present invention will be described below with reference to the accompanying drawings wherein like numerals represent like features throughout the several drawings and wherein:

FIG. 2(a) is an event/message trace of one user-registration procedure for use with the system of FIG. 1(a);

FIG. 2(b) is an event/message trace of another user-registration procedure for use with the system of FIG. 1(a);

FIG. 4(a) is an illustration of one web-site user-interface utilized in the system of FIG. 1(a);

DETAILED DESCRIPTION OF THE PREFERRED EMBODIMENTS

1. System Architecture Overview

Figure 1A:
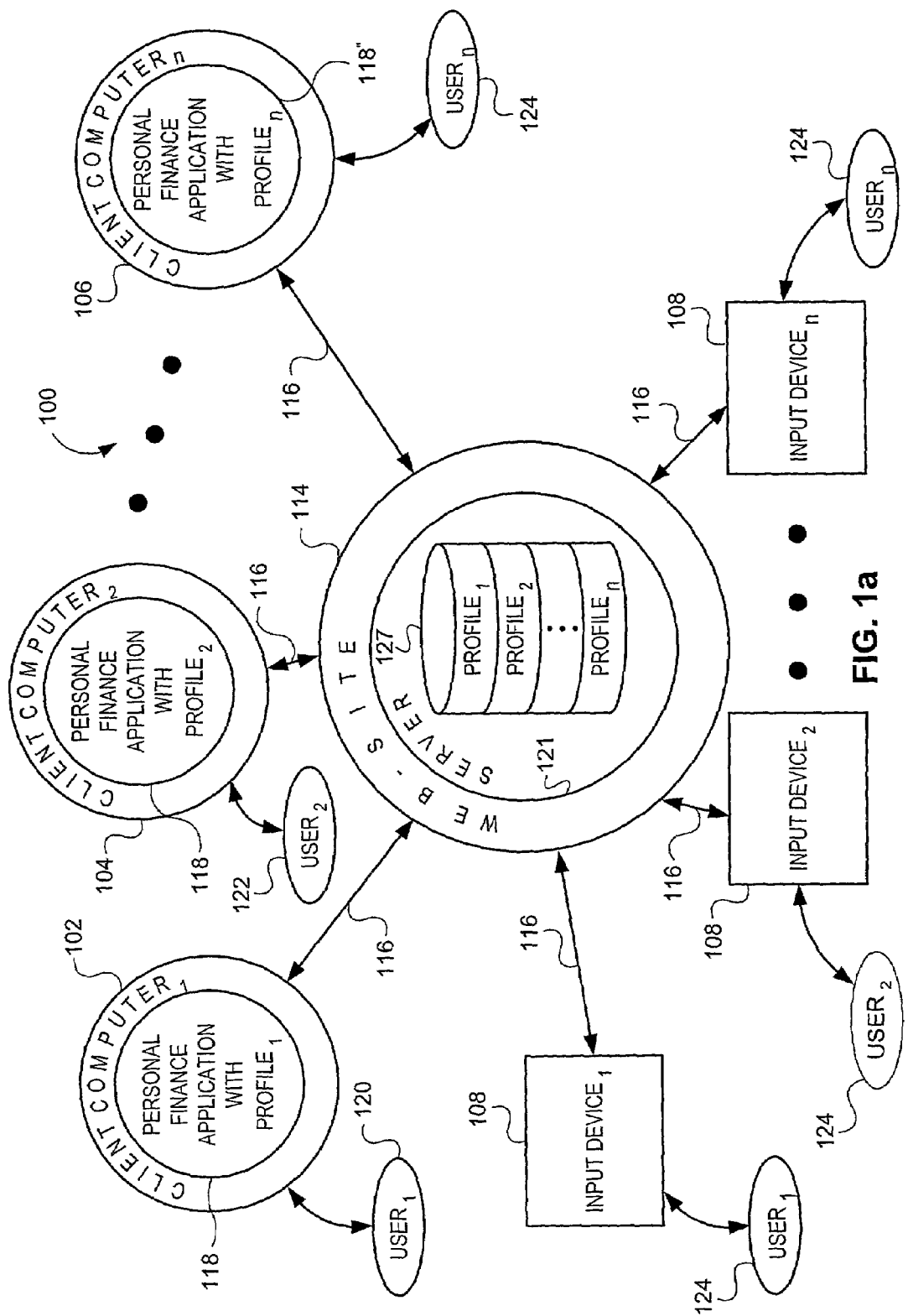
FIG. 1(a) is a schematic representation of a distributed information storage, modification and retrieval system in accordance with one preferred embodiment of the present invention.

With primary reference to FIG. 1(a), there is shown therein a schematic representation of a preferred financial-information storage, modification and retrieval system 100. The various components of system 100 are preferably communicatively linked together via a global communication network 116 so that a plurality of users in various remote geographic locations can utilize the system at various times.

At the core of system 100 is a web-site 114 which can be accessed by a plurality of users 120, 122, 124, etc. via communication network 116 with any one or more of client computers 102, 104, 106, etc. and/or input devices 108. Communication network 116 is preferably the Internet and web-site 114 preferably includes a web-server 121 with an associated database 127. As noted above, the client computers, the input devices and the web-site preferably communicate via the Internet and, particularly, the World-wide Web. However, it will also be appreciated that the principles set forth herein with respect to system 100 are directly applicable to many of the distributed communication networks currently known and/or in widespread use.

Those of ordinary skill in the art will recognize that FIG. 1(a) illustrates system 100 in canonical form. Accordingly, it will be understood that system 100 can include virtually any number of client computers (each having an associated user) which can access web-site 114 as shown. Similarly, system 100 can also include virtually any number of input devices connected to network 116. To simplify the discussion of system 100 below, user$_n$ 124 has been arbitrarily selected as a representative user who will typically utilize client computer$_n$ 106 and input device$_n$ 108. It should be understood, however, that any combination of users 120, 122, 124 etc. could be utilizing their own client computers or any one of the input devices 108 at any given time.

Web-site 114 generally serves the purpose of temporarily storing financial transaction information provided by the plural users at the various input devices 108 as desired. As shown in FIG. 1(*a*), server 121 is communicatively linked to network 116 for facilitating the transfer of information between database 127 and the various client computers and input devices. In one preferred embodiment, server 121 also includes a plurality of request handlers 123 which are preferably communicatively connected to a service manager 125 (see FIG. 1(*b*)). These request handlers are function-specific modules for processing assorted information-exchange requests as dictated by service manager 125. This is discussed in greater detail below.

Database 127 generally serves the purpose of preferably temporarily storing user-specific profiles and financial transaction information provided to web-site 114 by the various users. Server 121 dictates the particular manner in which information from the various users is stored into, modified at and/or retrieved from database 127. This also is discussed in greater detail below.

Generally, however, database 127 is preferably segregated into a plurality of user-specific profiles 128 for maintaining each user's financial transaction information independently of every other user's information. The structure of each of these user-profiles is preferably dictated by user-specified parameters corresponding to parameters which define the structure of the profiles contained within the respective users' personal finance applications. Accordingly, the structure of the financial profiles corresponds to and preferably replicates those of the respective users' personal finance software. This replication preferably has three aspects: an account list, a category list and a class list.

As noted above, system 100 also preferably includes a geographically distributed plurality of client computers 102, 104, 106, etc., each of which may be accessed by a particular user and is capable of providing access to communication network 116. It is expected that each of the client computers will be stationary and, in particular, will remain resident in a given user's home, office or the like. At a minimum, it is expected that each of the client computers will be less mobile than its associated user.

Client computers 102, 104, 106, etc. are preferably of conventional design, each including a processor, an addressable memory and other conventional features (not illustrated) such as a display, a local hard disk, input/output ports and a network-interface. Each display is of conventional design, preferably color-bit mapped and provides output for the user interface features of the present invention. The input/output ports support various input devices, such as a keyboard, mouse and the like, for inputting commands and information. The network-interface and a network communication protocol (typically including a conventional input device) provide access to communication network 116, via a TCP-IP type connection or the like. Each client computer may consist of an Intel-based computer operating under Microsoft Windows 3.1, Windows 95, Windows 98 or Windows NT; or any other equivalent operating system known in the art.

In accordance with the present invention, each client computer executes a personal finance application such as application$_n$ 118" of client computer$_n$ 106. The application is comprised of a number of executable code portions and data files. For example, the application includes code for creating and supporting a user interface and a user-specific (i.e., customized) financial profile. Typically, each personal finance application will be provided, to the client computer on which it is used, via a computer-readable medium such as a CD-ROM, diskettes or by electronic communication over the network for installation and execution on the client computer.

The preferred personal finance application for use in the present invention is Quicken® deluxe 98 manufactured and sold by Intuit, Inc. of Mountain View, Calif. One significant feature of this software package is that it includes a financial profile which can be customized by creating user-specific lists of accounts, categories, classes, etc. for organizing the user's particular financial information. By enabling a user to customize this software in a way which reflects the user's unique financial circumstances, the user can quickly and easily store and retrieve pertinent information in the manner in which the user ordinarily expects such information to present itself. In the absence of this ability, a user would be required to grapple with an unwieldy set of financial variables, most of which do not even pertain to any single user.

After having been customized by the various users, each instance of applications 118, 118' and 118", etc. represent slightly different versions of the same software, these versions having been modified by each user in a unique way. When installed in a given client computer, this software will typically cooperate with a conventional browser (such as Microsoft Internet Explorer® or Netscape Navigator®) also resident on the client computer so that the exchange of financial information between the personal finance application and web-site server 121 is possible via network 116.

As noted above, system 100 of FIG. 1(*a*) also includes a plurality of information-input devices 108 which are communicatively linked to network 116 for transfer of information with web-site 114. While devices 108 are preferably computers of the general nature described above with respect to client computers 102, 104, 106, etc., they can differ in a number of respects. First, they need not include any personal finance application whatsoever. Rather, all that is required is that they include capabilities of receiving information from users and of exchanging information with web-site 114 via network 116. Preferably, this is achieved through the use of a conventional browser such as Microsoft Internet Explorer® or Netscape Navigator®. Second, input devices 108 need not be personal computers at all. Instead, these input devices could merely be personal digital assistants (PDAs) equipped with the capability of utilizing network 116. Similarly, the input devices could be function-dedicated devices for communicating over network 116; for example, any of these devices could be Web TV® devices manufactured and sold by Sony. Alternatively, any of the input devices could be the combination of a computer and a web-site where financial transactions occur electronically, the computer having contacted the web-site for this purpose (see FIG. 1(*c*)). Thus, for example, transaction information associated with an Internet purchase can be automatically uploaded from the vendor's web-site to database 127. If this occurs, then the transaction information will have been, at least substantially instantaneously, uploaded to database 127 without any additional effort or expense on the purchaser's part.

2. Sub-System Architecture and Operation Details

A more detailed description of the exchange of information between a representative input device$_n$ 108, client computer$_n$ 106 and web-site 114 is possible with reference to FIG. 1(*b*). As shown therein, sub-system 100' of system 100 includes input device$_n$ 108, client computer$_n$ 106 and web-site 114 which are all communicatively connected via network 116.

Within client computer$_n$ 106 is application$_n$ 118". Some of the various components of personal finance application$_n$ 118" include a finance application database 130, a request manager 132, a batch handler 134, a plurality of request handlers 136 and a standard HTTP library to permit communication over network 116. As shown, batch handler 134 is communicatively connected to network 116 and to request manager 132. Additionally, request manager 132 is communicatively connected with finance application database 130 and request handlers 136. Finally, request handlers 136 are also communicatively connected directly to network 116.

Within web-site 114 is a server 121 and a database 127 with a plurality of user-specific profiles 128 contained therein, database 127 being communicatively connected to a service manager 125. Service manager 125 is further communicatively connected to network 116 and to a plurality of request handlers 123. In one preferred embodiment, service manager 125 manages the flow of information between network 116, request handlers 123 and database 127. Service manager 125 preferably utilizes profile-identification information, generated from user names and passwords from the users, to store and retrieve information received via network 116. As suggested by the architecture of server 121, all of the information received and sent by server 121 passes through service manager 125 for processing.

Request handlers 123 of server 121 process information exchange requests received by input device$_n$ 108 and client computer$_n$ 106 via network 116. Each of these information-exchange requests is one of (a) a request to store information; (b) a request to modify previously stored information; (c) a request to delete previously stored information; or (d) a request to retrieve previously stored information. Upon receipt of an information-exchange request at web-site 114, service manager 125 routes the request to the appropriate request handler for processing and the appropriate action is taken at database 127. Insofar as service manager 125 is capable of recognizing profile-identification information associated with each of the plural users, service manager 125 can access database resources for storing and retrieving the financial information provided by the respective users.

Figure 1B:
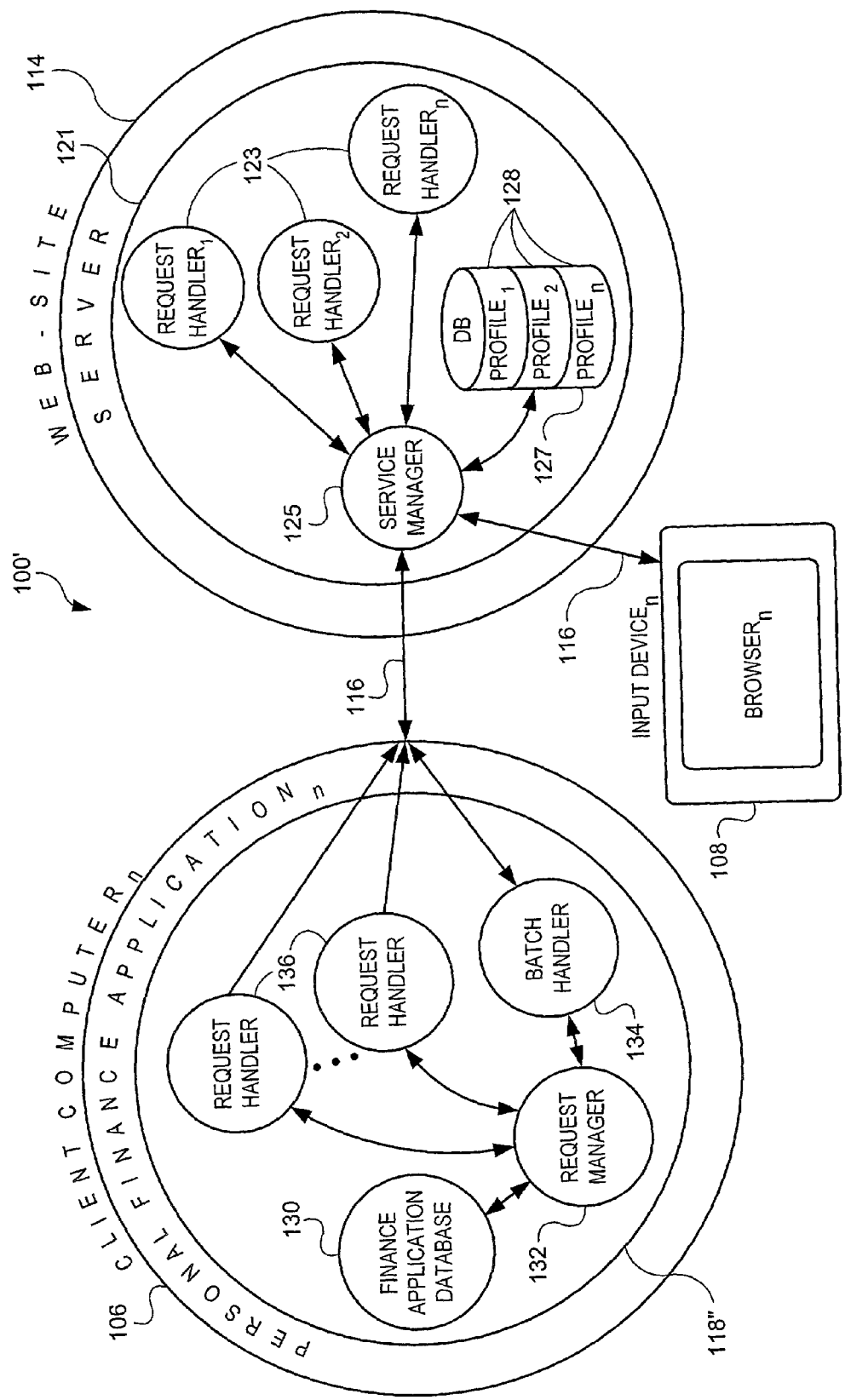
FIG. 1(b) is a schematic representation of a portion of the system of FIG. 1(a) wherein certain features of one preferred embodiment of the present invention are shown in greater detail.

As shown in FIG. 1(b), some similarities exist between the architecture of personal finance application 118" and that of server 121. In particular, it is noted that all of the information received by application 118" is passed through request manager 132 for appropriate distribution between request handlers 136 and finance application database 130. Similarly, much of the information originating within application 118" passes through request manager 132 and batch handler 134 before entering network 116. This architecture enables batch handler 134 to batch (i.e., group together) a plurality of information-exchange requests for simultaneous transmission over network 116, thereby reducing the number of transactions and the transaction time associated with information transmissions. However, certain information-exchange requests are sent directly from request handlers 136 to network 116. These include, for example, requests for historical quotes. Each of request handlers 136 knows the request receiving format of server 121 and, therefore, can prepare requests in an appropriate format for transmission to server 121. Additionally, each of request handlers 136 knows the format of transmissions received from web-site server 121. Therefore, handlers 136 can appropriately parse transmissions received from server 121.

Figure 1C:
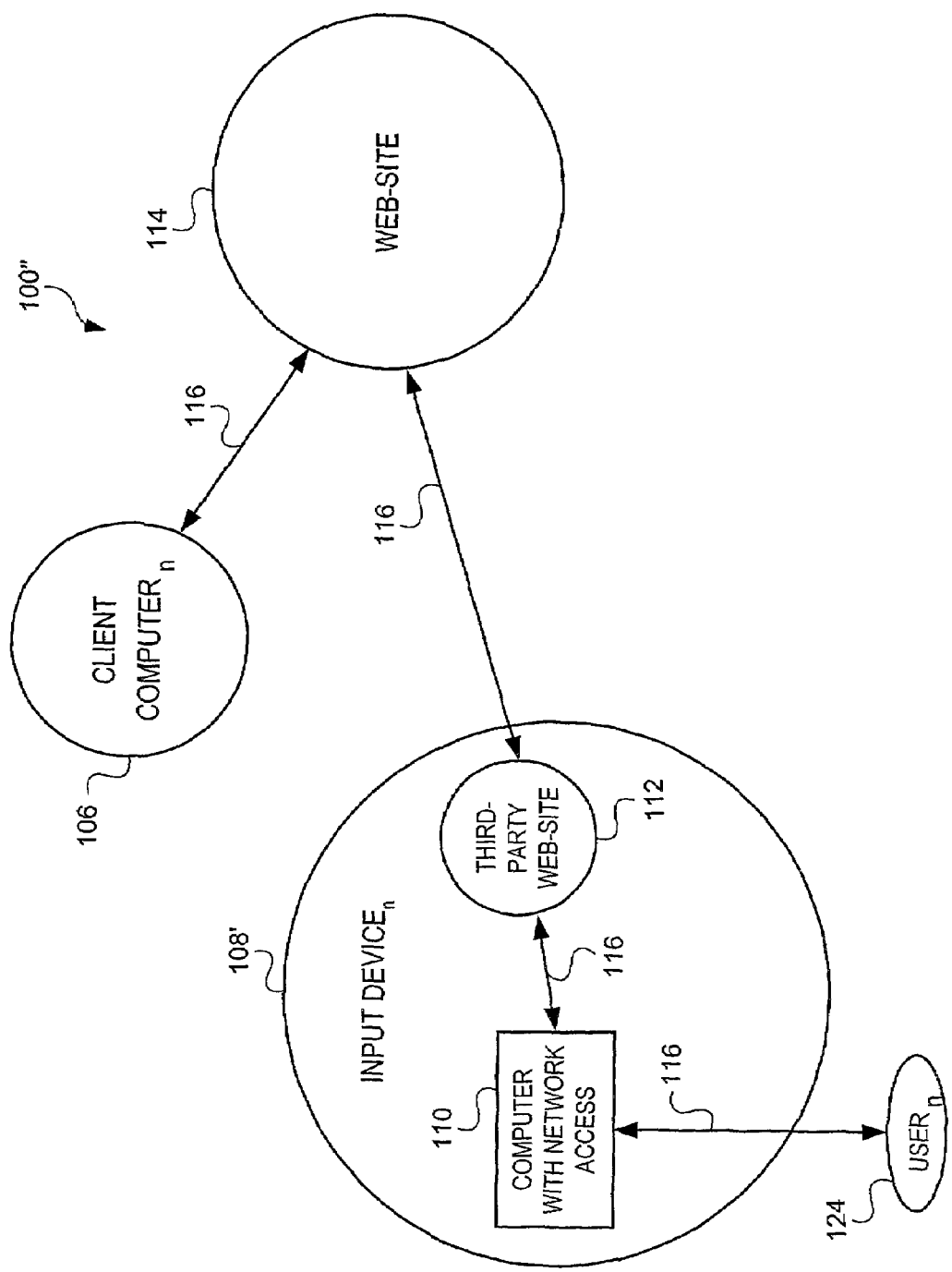
FIG. 1(c) is a schematic representation of an alternative portion of the system of FIG. 1(a) wherein certain features of an alternative preferred embodiment are shown in greater detail.

An alternative portion of system 100 (FIG. 1(a)) is illustrated in FIG. 1(c). As shown therein, sub-system 100" includes client computer$_n$ 106, web-site 114 and alternative input device$_n$ 108', these components being communicatively linked via network 116. In this alternative embodiment, input device$_n$ 108' includes the combination of a conventional personal computer with network access 110 (or its equivalent such as a PDA or a Web TV® device) and a third-party web-site 112 which are communicatively linked via network 116. Web-site 112 could be the web-site of a bank, a governmental agency and/or a commercial vendor; in essence it could be any web-site where financial transactions can occur electronically. Assuming user$_n$ 124 utilizes the present invention, information associated with that user's electronic transaction can be virtually instantaneously uploaded to web-site 114. This could occur by implementing a browser redirect feature, a back-end network feature or other equivalent methods known in the art. In addition to enhancing the above-noted benefits of the present invention, sub-system 100" of FIG. 1(c) offers the possibility of automatic reconciliation of electronic bank records which have automatically been uploaded to web-site 114.

3. Methods of Operation

There are four basic functions performed on preferred system 100 in order to achieve the goals of the present invention. These functions are: 1) registration; 2) financial information upload; 3) financial information download; and 4) acceptance of financial information. These four functions will be discussed in detail below, in the order set forth above and with reference to the remaining figures.

a. Registration

In one preferred embodiment of the present invention, the first step in utilizing system 100 is for a given user to register at server 121. In this embodiment of the invention, it is possible for a user to register with server 121 from the user's respective client computer or from any of one of input devices 108. The procedures for registering from each of these locations are different and are, respectively, set forth in the event/message traces of FIGS. 2(a) and 2(b). For complete registration to occur, both procedures are preferably performed, but either procedure can be performed first. They will be discussed in turn.

(i) First Registration Option

With primary reference now to FIG. 2(a), there is depicted an event/message trace showing a first registration procedure 200 in accordance with an embodiment of the present invention. As shown therein, procedure 200 entails interaction between user$_n$ 124, client computer$_n$ 106 and web-site server 121. Naturally, input device$_n$ 108 plays no part in this registration procedure.

As shown, registration procedure 200 is initiated when a connection is established between client computer$_n$ 106 and web-site server 121 and when web-site server 121 sends 202 a user identification request to client computer$_n$ 106. In response to the information request, user$_n$ 124 provides 204 a desired user name and password to client computer$_n$ 106. Optionally, some demographic information can also be provided. The user name and password, together with user-specific financial profile information and last-transaction downloaded information are sent 206 (preferably in DCG script) from client computer$_n$ 106 to web-site 114.

The user-specific financial profile information preferably includes the accounts, categories, and classes which, at least in part, define the respective lists utilized by the user's personal finance application. Preferably, server 121 subsequently utilizes this information to help the user enter financial transaction information in a manner which is customary for the user. Additionally, server 121 utilizes this information to subsequently store information and to download previously inputted information in a format which is readily recognizable by the user's personal finance application.

The last transaction downloaded information sent to server 121 indicates the last transaction which was downloaded from server 121 to client computer$_n$ 106. This information is utilized for various purposes throughout the process but, upon registration, (i.e., initially) has a trivial value of zero.

Upon receipt of information from client computer$_n$ 106, web-site server 121 generates 208 unique profile-identification information (preferably a strong random number) and stores 209 both the received and generated information within database 127.

The final step of registration procedure 200 is for server 121 to send 210 the newly generated profile-identification information and any transaction information which may have previously been stored at server 121. The profile-identification information is preferably stored 211 on client computer$_n$ 106 as a "cookie" to facilitate automatic user-recognition at server 121 in the future. The possibility that transaction information could be supplied to client computer$_n$ 106 upon initial registration arises from the possibility that user$_n$ 124 could previously have registered with server 121 from an input device$_n$ 108 and may have even uploaded financial transaction information at that time. (See discussion of Second Registration Option below.) Upon completion of registration process 200, server 121 will be able to easily identify user$_n$ 124 and retrieve the appropriate financial profile information to facilitate storage, modification and/or retrieval of information in accordance with the invention.

(ii) Second Registration Option

An alternative registration procedure 200' is illustrated in FIG. 2(b). Registration procedure 200' involves interaction between web-site server 121, input device$_n$ 108 and user$_n$ 124. Naturally, client computer$_n$ 106 is not involved in this registration procedure.

Procedure 200' commences with the establishment of a connection between server 121 and input device$_n$ 108 and with server 121 requesting 202' user-identification information from input device$_n$ 108. In response, user$_n$ 124 provides 204' a desired user name and password to input device$_n$ 108. Optionally, some demographic information can also be provided. All of this information is then sent 206' (preferably in DCG script) to web-site server 121 where profile-identification information is generated 208' and stored 209' in database 127. The profile-identification information is then sent 210' to input device$_n$ 108 where it is stored 211' as a "cookie" for facilitating automatic user-recognition in the future.

(iii) Differences Between Registration Options

The primary differences between registration procedures 200 and 200' are two-fold. First, while procedure 200 utilizes client computer$_n$ 106, procedure 200' utilizes input device$_n$ 108. Second, and more significantly, registration procedure 200' does not result in server 121 obtaining financial profile information from the user. With procedure 200', this will only occur upon subsequent communication between client computer$_n$ 106 and server 121 per procedure 200. Accordingly, uploading of financial transaction information from input device$_n$ 108 at this time is not optimally convenient. It is possible, however, as will be discussed in greater detail below.

b. Uploading Financial Information

Figure 3:
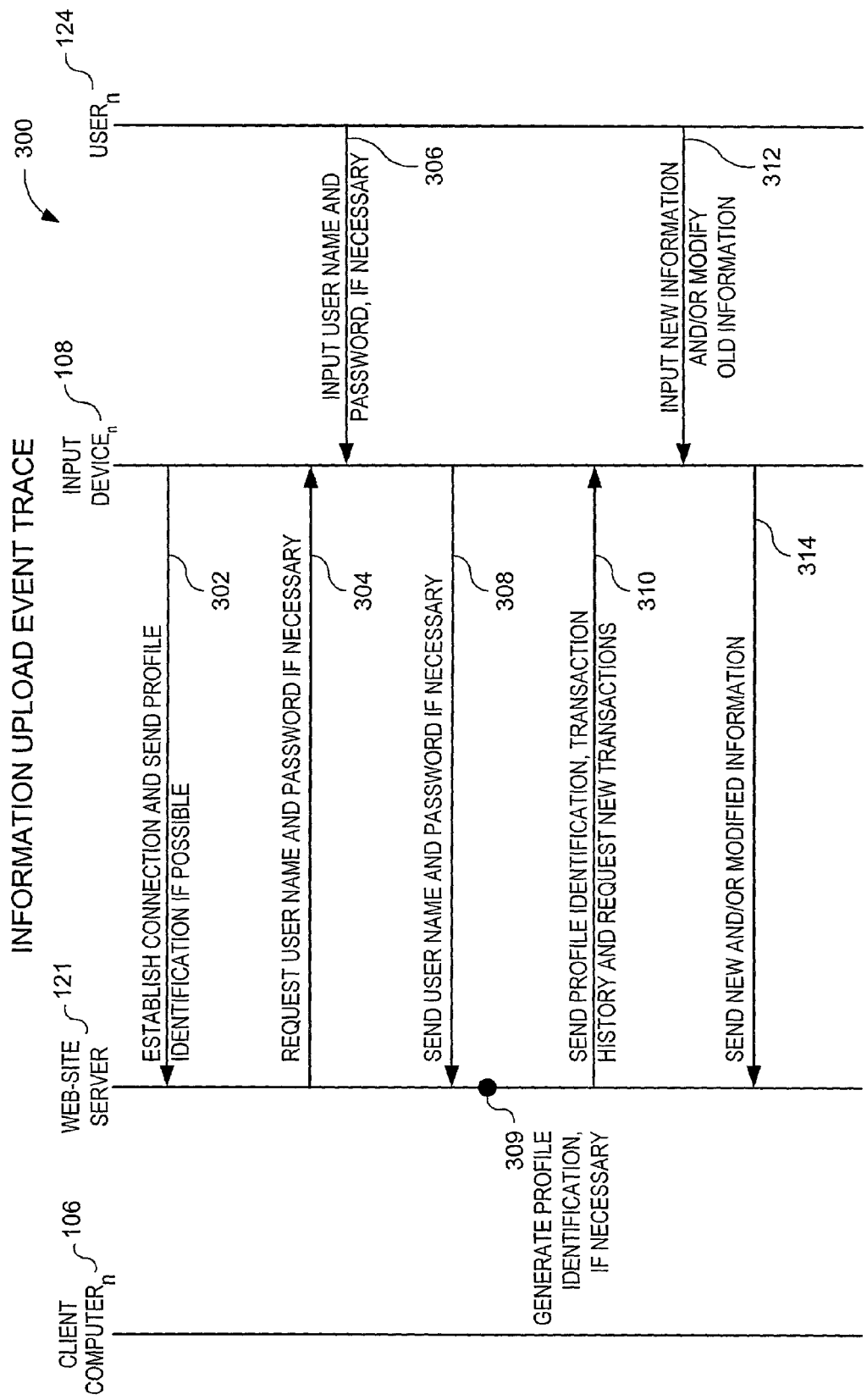
FIG. 3 is an event/message trace of a financial information upload procedure for use with the system of FIG. 1(a)

One preferred procedure 300 for uploading financial transaction information to server 121 will now be discussed in detail with joint reference to FIGS. 3 through 4(c). With initial reference to the event/message trace of FIG. 3, it will be noted that upload procedure 300 entails interaction between server 121, input device$_n$ 108 and user$_n$ 124. Thus, client computer$_n$ 106 will play no part in this process. These circumstances correspond to the situation in which user$_n$ 124 does not have access to client computer$_n$ 106 and, therefore, is using system 100 (FIG. 1(a)) to temporarily store financial transaction information from some accessible input device.

It will be appreciated that upload of financial information occurs only after user$_n$ 124 at least partially registers with server 121, such registration occurring by at least one of the two registration procedures discussed above. The procedure for uploading transaction information, however, will vary slightly depending on whether or not web-site server 121 has received and stored financial profile information for user$_n$ 124. The case in which server 121 has not received the financial profile information will be considered first with respect to FIGS. 3 and 4(a). Variations in the procedure arising from receipt of registration-structure information at server 121 will then be considered with reference to FIGS. 4(b) and 4(c).

Upload procedure 300 commences with input device$_n$ 108 establishing a connection with server 121 and sending 302 previously received profile-identification information, if any, to server 121. If registration has not previously occurred, server 121 will request 304 a user name and password from input device$_n$ 108. If this is the case, user$_n$ 124 will input 306 a desired user name and password and the same will be sent 308 to server 121. The server will then generate 309 profile identification information. If there is an error in the above-described process (e.g., an unrecognized password has been entered), some of the above steps, and possibly some of the above-described registration steps, will be repeated.

If any previous transactions have occurred, server 121 will send 310 a chronological transaction history for display and, if necessary, the newly generated profile information. In any event, server 121 also will request 310 receipt of new financial transaction information from input device$_n$ 108. In response thereto, user$_n$ 124 will input 312 new transaction information and/or modify the information already contained within server 121 as reflected by the transaction history. Finally, any new information supplied to input device$_n$ 108 is sent 314 to web-site server 121 for incorporation into database 127.

One user interface 400 utilized during the above-described information upload procedure 300 is illustrated in FIG. 4(a). In the state depicted therein, user interface 400 reflects a situation in which several financial transactions have been previously uploaded to server 121. Additionally, interface 400 reflects a situation in which user$_n$ 124 is in the midst of entering information for a new financial transaction.

As shown in FIG. 4(a), interface 400 preferably includes a history summary window 401, a transaction entry window 402, a transaction history window 403 and a Remove function 444. Transaction summary window 401 indicates the number of transactions which have been uploaded to server 121 and await downloading into client computer$_n$ 106. In the state depicted in FIG. 4(a), there are three such transactions and these correspond with the transactions listed in window 403 (see discussion below).

Transaction entry window 402 of FIG. 4(a) includes a plurality of free-form data entry fields, an Enter-Transaction button 419 and a Clear-Form button 420. The data entry fields include an Account field 404, a Type field 406, a Date field 408, a Payee field 410, an Amount field 412, a Check # field 414, a Category field 416 and a Memo field 418. Those familiar with personal finance applications will understand how to utilize these fields and that these parameters, while not exhaustive, are sufficient to uniquely describe any given financial transaction. Therefore, no further discussion of these fields is necessary. It should be noted, however, that since, in this case, server 121 has not received financial profile information from user$_n$ 124, Account and Category fields 404, 416 must be completed free-form by user$_n$ 124. As discussed below, this process can be facilitated if financial profile information has been received at server 121. Finally, those with ordinary skill will readily appreciate that a properly completed transaction can be entered into server 121 by selecting the Enter-Transaction button 419. This creates a transaction record in text format, the record being assigned an associated transaction number. Alternatively, the various fields within text entry window 402 can be cleared by selecting Clear-Form button 420 in the event that an entry error has occurred. Regardless of whether button 419 or button 420 has been selected, however, the user can then begin entering a new transaction.

User interface 400 also preferably includes transaction history window 403. In the example shown, three transactions have previously been uploaded to web-site server 121 and this transaction information is displayed in window 403. This feature of the present invention permits a user to modify and/or delete financial transaction information which has previously been uploaded into server 121. As indicated by Status fields 438, 438' and 438", transaction history window 403 displays transaction information regardless of whether or not such information has previously been downloaded to client computer$_n$ 106. Accordingly, Status fields 438, 438' and 438" can assume either downloaded or not-downloaded states. Additionally, Delete and Edit functions 440 and 442 are provided for each transaction to permit user$_n$ 124 to delete or modify the previously entered transactions as desired. In the preferred embodiment of the present invention, it is possible to view up to 50 previously entered transactions and each transaction will appear in window 403 until it is manually deleted.

Finally, as noted above, user interface 400 preferably includes a Remove function 444 to provide user$_n$ 124 with the option of removing previously supplied financial profile information. This feature is desirable in instances when, for example, a given user no longer wishes to utilize system 100 of the present invention.

Figure 4B:
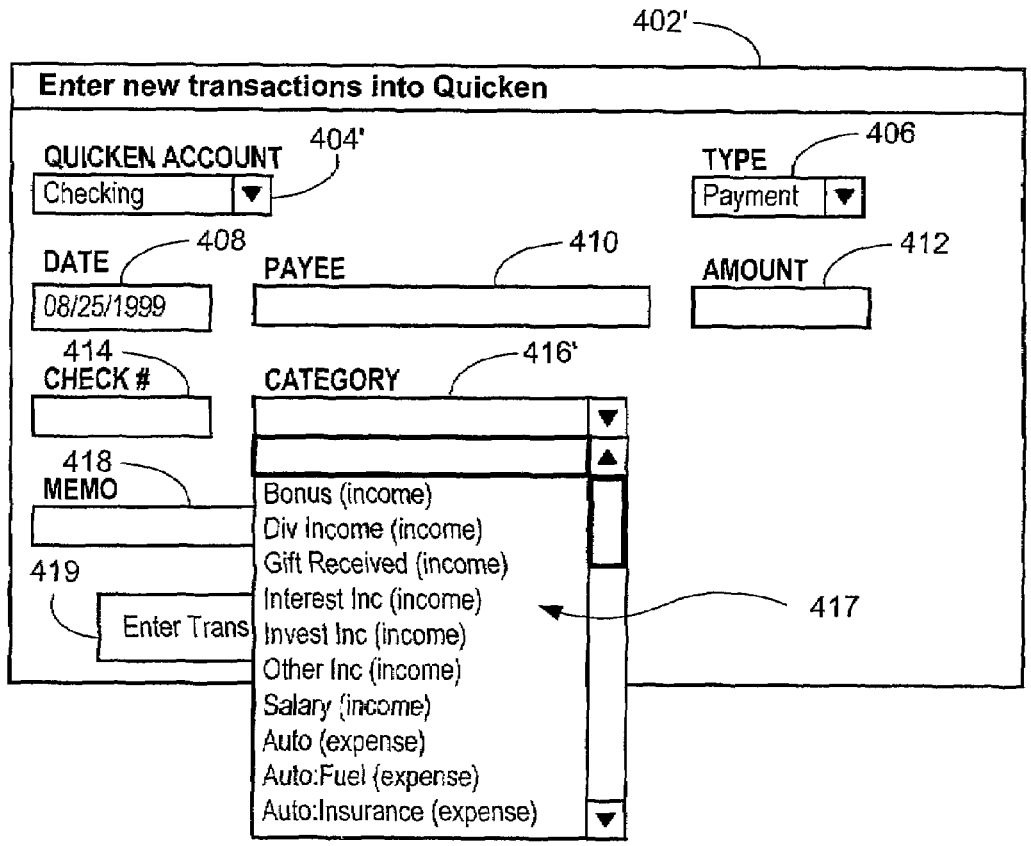
FIG. 4(b) is an illustration of another web-site user-interface utilized in the system of FIG. 1(a)
Figure 4C:
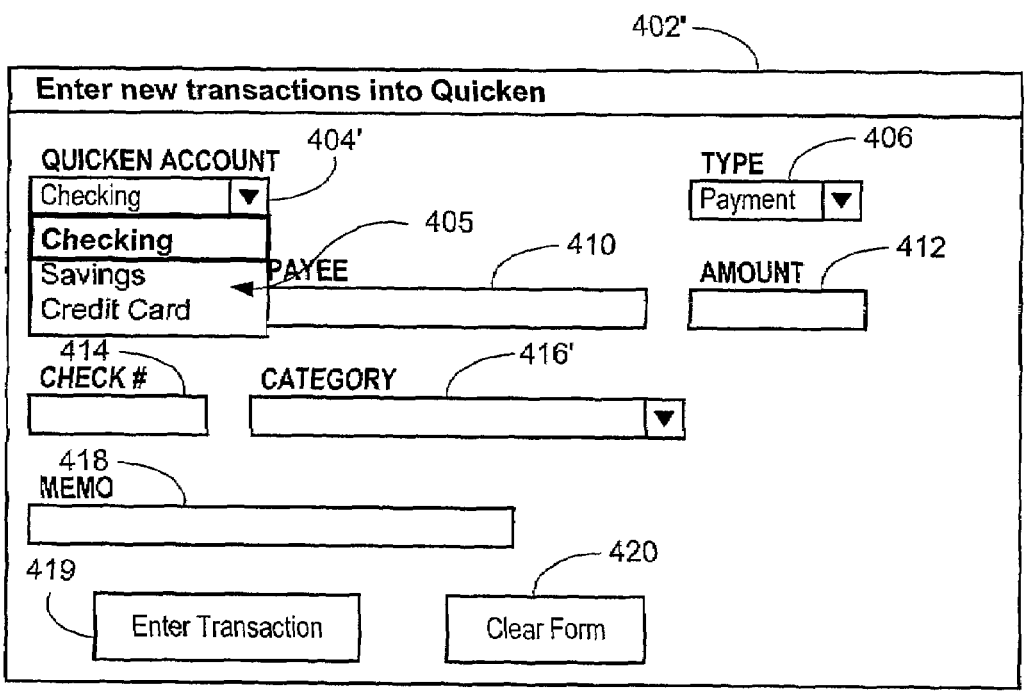
FIG. 4(c) is an illustration of the web-site user-interface of FIG. 4(b) showing other features of the user-interface of FIG. 4(b)

FIGS. 4(b) and 4(c) illustrate how previously supplying financial profile information to server 121 can facilitate entry of financial transaction information and reduce related errors. This will occur if registration procedure 200 has been performed with client computer$_n$ 106. If so, financial profile information will be sent to server 121 along with the user name and password. This financial profile information preferably includes an account list and a category list and an optional class list. Upon receipt of these lists, server 121 generates and stores a check sum or signature (e.g., MD5) for each list. These check sums facilitate information upload and/or download as discussed below.

With initial reference to FIG. 4(b), it will be appreciated that text entry window 402' is identical to text entry window 402 of FIG. 4(a) except that the Account and Category fields are slightly modified. In this case, window 402' displays a category list 417 which is part of the financial profile information provided to server 121. Thus, category list 417 preferably corresponds with the category list of user$_n$'s 124 personal finance application$_n$ 118". Upon selection of Category field 416', a drop-down window displaying category list 417 appears and user$_n$ 124 can select one of categories listed. In addition to reducing information entry errors, such as misspellings, this feature serves as a pneumonic device so that user$_n$ 124 can more easily identify and/or select the personally-defined category information for a given transaction.

With reference to FIG. 4(c), transaction entry window 402' again is depicted. In this instance, Account field 404' has been selected, thereby displaying a drop-down window with an account list 405 which also is a part of the financial profile information provided to server 121. Thus, account list 405 preferably corresponds with the account list of user$_n$ 124 personal finance application$_n$ 118". This allows the user to select one of their own accounts for the transaction. As with category list 417, account list 405 was previously supplied to server 121 and operates to reduce information input errors and to facilitate accurate data entry because user$_n$ 124 can input data simply by selecting one of the accounts listed. Thus, account list 405 serves to reduce spelling errors and also serves as a pneumonic device.

Aside from the differences noted above, information upload can occur regardless of whether or not financial profile information has been supplied to server 121. For example, in an alternative embodiment, web-site 114 includes a predetermined and generic set of profile parameters and/or parameter values. This financial profile information could be provided by a third-party source or originally included in the web-site. While not necessarily the case, this information could be identical to the information in a companion personal finance application prior to customization by a user. Regardless, this embodiment permits a user to select, for example, accounts and categories which are not supplied by the user and, thus, do not necessarily correspond to the accounts and categories of any user's customized application financial profile. Since, however, there is a likelihood of such correspondence, the user may, nonetheless, receive some benefit from such a predetermined financial profile existing on the database. Thus, merely by way of example, predetermined and generic account lists and category lists can be displayed and values can be selected in the same way as discussed above with respect to FIGS. 4(b) and 4(c). If a given personal financial application happens to have an identical financial profile, automatic integration of financial transaction information into the application can occur during and/or after download of such information. To the extent that the application financial profile differs from the predetermined database financial profile, some corrective action may need to be taken by a user to complete information integration. Still other options open to users include the option to (1) modify the predetermined and generic profile information from an input device; and/or (2) to input some financial transaction information in a form incompatible with the database profile information (e.g., by manually entering an account which is not included in an account list).

c. Downloading Financial Information

Figure 5:
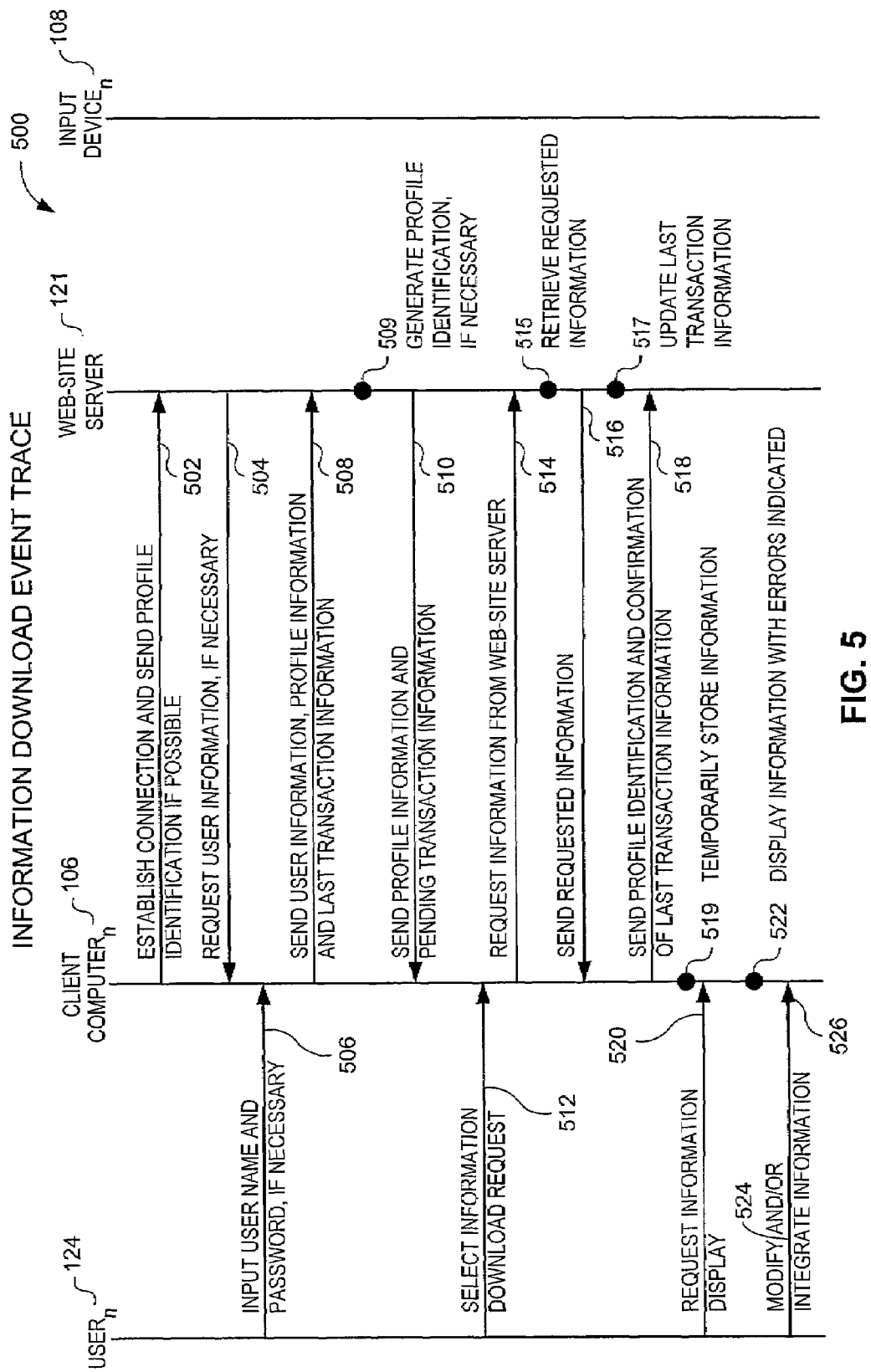
FIG. 5 is an event/message trace of a financial information download procedure for use with the system of FIG. 1(a)

The preferred financial information download procedure 500 is depicted in FIG. 5. As shown therein, download procedure 500 entails interaction between web-site server 121, client computer$_n$ 106 and user$_n$ 124. Thus, input device$_n$ 108 will play no part in this process. These circumstances correspond to the situation in which user$_n$ 124 has access to client computer$_n$ 106 and, therefore, is using system 100 (FIG. 1(a)) to retrieve financial transaction information previously uploaded to server 121 (see discussion above).

Download procedure 500 commences with client computer$_n$ 106 establishing a connection with server 121 and sending 502 previously received profile-identification information, if any, to server 121. If registration has not previously occurred, server 121 will request 504 a user name and password from client computer$_n$ 106. If this is the case, user$_n$ 124 will input 506 a desired user name and password and the same will be sent 508 to server 121 along with the appropriate financial profile information and last transaction data. The server 121 will then generate 509 profile identification information, if necessary, and send 510 the profile information and pending transaction information to the client computer$_n$ 106. If there is an error in the above-described process (e.g., an unrecognized password has been entered), some of the above steps, and possibly some of the above-described registration steps, will be repeated.

Download procedure 500 then proceeds when user$_n$ 124 selects 512 an information request function from within the user$_n$'s 124 personal finance application. In response thereto, client computer$_n$ 106 then sends 514 to server 121 an information download request, profile-identification information, last transaction information, lists for accounts, categories and classes of the profile and a check sum for each list.

Server 121 then determines if any of the lists have changed by comparing the transmitted check sum for each list with a check sum for each corresponding list stored in the database. If all of the check sums match, then the financial profile information stored within database 127 can be utilized. The fact that client computer$_n$ 106 delivers financial profile information each time it establishes connection with server 121 ensures that the financial profile of the database always corresponds with that of the user's personal finance application, even if the user changes the financial profile of the user's application, e.g., by adding new categories or accounts or by deleting old ones. In the event that one or more of the check sums do not match, server 121 utilizes the newly transmitted financial profile information and server 121 retrieves 515 the financial profile information from the database and those transactions which are later than the last transaction information indicates.

The status of each transaction is dependent on the last transaction information received from client computer$_n$ 106. The status is either downloaded or not downloaded. Server 121 determines which transaction(s) should be downloaded to computer$_n$ 106 based on the last transaction information received from computer$_n$ 106. By relying on the last transaction information provided by the client (instead of a status flag stored within database 127), system 100 provides a measure of protection in the event that a given client computer crashes. In this event, the client computer would then be restored by using an old backup (including old last transaction information). Thus, when computer$_n$ 106 establishes its next connection with server 121, the server, relying on the earlier last transaction information, will retrieve and deliver all of the financial transaction information necessary to fully update personal finance application$_n$ 118". This is true even if some transactions were previously downloaded, but not deleted, from server 121.

After retrieval 515 of the requested information from database 127, server 121 formats the transaction information in a text field format which can be understood by the personal finance application 118 of client computer$_n$ 106. In order to achieve this result, server 121 includes a DCG script that formats the transaction information in an appropriate form. Additionally, DCG calls a UNIX daemon which, in turn, communicates with the database to obtain the requested transaction information.

Web-site server 121 then sends 516 the requested information to client computer$_n$ 106 and updates 517 the last transaction information retained within database 127. The client computer$_n$ 106 then sends 518 profile identification and confirmation of last transaction information to the server 121. Once the requested information arrives at client computer$_n$ 106, the information is stored 519 in a temporary file (preferably in a Windows .ini format) pending further user action from within the user$_n$'s 124 personal finance software$_n$ 118". At some desired time, user$_n$ 124 can request 520 that application$_n$ 118" display the downloaded information for a possible modification, acceptance and/or deletion. In response to this request, application$_n$ 118" displays 522 the downloaded transaction information with an indication that errors exist in the downloaded information if this is the case. As one example, such errors may include an account name which does not appear on the account list of application 118". In the event that errors exist, user$_n$ 124 may modify 524 the transaction information as appropriate. When all of the errors, if any, have been corrected, user$_n$ 124 can integrate 526 the downloaded information, in which case client computer$_n$ 106 automatically integrates the downloaded transaction information into personal finance application$_n$ 118". This merges each transaction into the corresponding account identified in the transaction.

d. Accepting Financial Information

Figure 6:
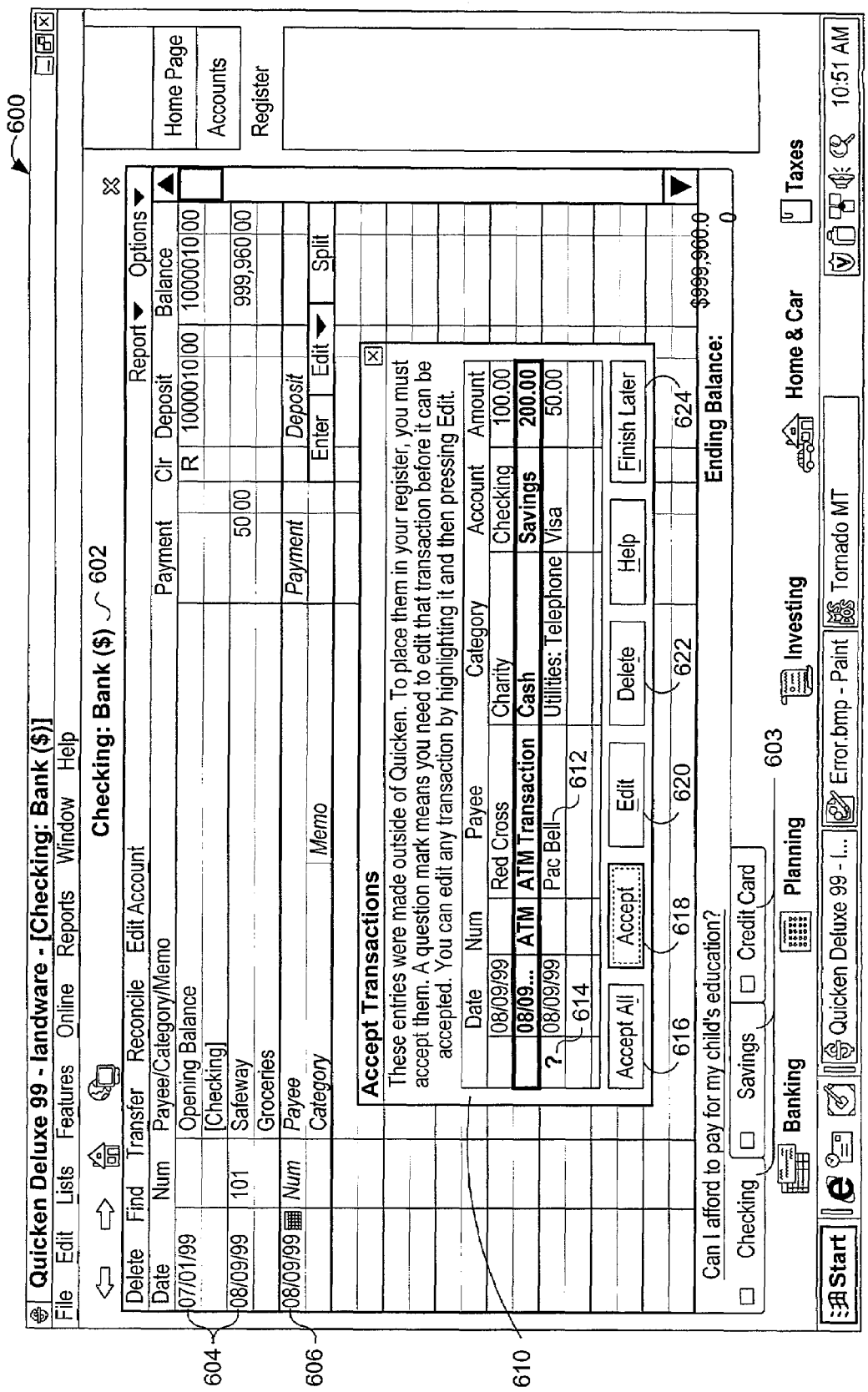
FIG. 6 is an illustration of one personal finance application user-interface utilized in the system of FIG. 1(a).

With reference now to FIG. 6, there is depicted a personal finance application user interface 600 which includes an account screen 602 and an Accept Transactions window 610. As shown in FIG. 6, the financial profile of this personal finance application includes a checking account, a savings account and a credit card account (only the checking account is displayed on account screen 602) as evidenced by the account buttons 603; buttons 603 being indicative of the account list for this particular profile. A pair of previously entered transactions 604 appear on the upper portion of screen 602 and a new transaction field 606 has been activated so that user$_n$ 124 can manually input financial transaction information therein.

In the state shown in FIG. 6, personal finance application$_n$ 118" has previously received three transactions which were uploaded from some remote input device and subsequently downloaded into personal finance application$_n$ 118" in accordance with the procedures described above. Additionally, user$_n$ 124 has invoked the accept transaction function of application$_n$ 118" whereupon Accept Transaction window 610 has appeared, the downloaded financial transaction information 612 being displayed.

Upon invoking the accept transaction function, the personal finance application matches the account name from each transaction to the account names from the account list of the personal finance application. In the event that any of the account names which have been downloaded do not match any of those included in the account list, an error indicator 614 appears. As shown in FIG. 6 this is preferably in the form of a question mark. Similarly, an error in the category information which has been downloaded will generate an error indicator. In alternative embodiments, other errors will also yield an error indicator. Preferably, a user$_n$ 124 must edit the downloaded transactions to eliminate any such errors prior to acceptance and, hence, integration of the transaction information. This can be commenced by selecting Edit button 620. The user may edit any aspect of a transaction, including its date, type, payee, amount, etc. Alternatively, transactions can be deleted by selecting a Delete button 622. In the event that user$_n$ 124 so desires, a Finish-Later button 624 can be selected, thereby permitting subsequent completion of the acceptance procedure.

In the event that a single transaction is error-free, that transaction can be integrated into the application by selection of an Accept button 618. This enters the transaction into the account specified in the transaction. Provided that all of the downloaded transactions are error-free as indicated by the absence of an error indicator, an Accept-All button 616 can be selected to integrate all of the transactions into the application simultaneously. This completes the acceptance procedure and the user can, once again, use the personal finance software as usual.

While the present invention has been described in connection with what presently is considered to be the most practical and preferred embodiments, it is to be understood that the invention is not limited to the disclosed embodiments, but is intended to cover all of the various modifications and equivalent arrangements included within the spirit and scope of the appended claims.

What is claimed is:

1. A method for managing financial transactions comprising:
   storing a financial profile associated with a financial application on a client computer, wherein the financial profile comprises a plurality of financial accounts;
   sending, from the client computer, a parameter including a list of the plurality of financial accounts to a web server for use in generating a replica of the financial profile on the web server, wherein the financial profile stored on the client computer exists before the replica;
   sending a copy of a first financial transaction record (FTR) comprising a first timestamp from the client computer to the web server after sending the parameter, wherein the first timestamp records an occurrence of a first financial transaction, and wherein the first FTR is stored on the web server before the copy of the first FTR is sent from the client computer to the web server;
   receiving, from the web server, a second FTR comprising a second timestamp and identifying a financial account selected from the plurality of financial accounts in response to sending the first FTR, wherein the second FTR is generated by the web server using financial transaction information sent to the web server from an input device, and wherein the financial transaction information is sent to the web server before the copy of the first FTR is sent to the web server from the client computer; and
   adding the second FTR to the financial account of the financial application on the client computer,
   wherein the input device is separate from the client computer,
   wherein the second timestamp records an occurrence of a second financial transaction at the input device, and
   wherein the first timestamp precedes the second timestamp.

2. The method of claim 1, wherein the parameter further comprises at least one selected from a group consisting of a checksum and a signature of the list of the plurality of financial accounts.

3. The method of claim 1, wherein the input device comprises a third-party website.

4. The method of claim 1, further comprising:
   receiving a profile identification from the web server after sending the parameter; and
   using the profile identification for automatic recognition of the client computer to the web server prior to sending the copy of the first FTR.

5. The method of claim 4, wherein the profile identification is a random number generated by the web server and is stored on the client computer as a cookie.

6. The method of claim 1, further comprising:
   modifying, on the client computer, at least one selected from a group consisting of the financial account and a category associated with the second FTR prior to storing the second FTR.

7. A method for managing financial transactions comprising:
   receiving, at a web server and from a client computer executing a financial application, a parameter comprising a list of a plurality of financial accounts associated with a financial profile of the financial application;
   generating, at the web server, a replica of the financial profile using the parameter, wherein the financial profile on the client computer exists prior to the replica;
   receiving, at the web server, financial transaction information from an input device, wherein the input device is separate from the client computer;
   receiving, at the web server, a copy of a first financial transaction record (FTR) comprising a first timestamp from the client computer after receiving transaction information from the input device, wherein the first timestamp records an occurrence of a first financial transaction, and wherein the first FTR is stored on the web server before receiving the copy of the first FTR from the client computer;
   generating, at the web server, a second FTR using the financial transaction information, wherein the second FTR comprises a second timestamp and identifying a financial account selected from the plurality of financial accounts, and wherein the second timestamp records an occurrence of a second financial transaction at the input device; and
   sending the second FTR from the web server to the client computer in response to receiving the first FTR, wherein the first timestamp precedes the second timestamp, and wherein the second FTR is added to the financial account of the financial application on the client computer.

8. The method of claim 7, wherein the parameter further comprises a checksum of the list of the plurality of financial accounts.

9. The method of claim 7, further comprising:
   generating a check sum of the list of the plurality of financial accounts;
   receiving a new list from the client computer; and
   comparing the check sum of the list of the plurality of financial accounts with a check sum of the new list prior to sending the second FTR.

10. The method of claim 7, further comprising:
    sending a profile identification to the client computer after receiving the parameter; and
    using the profile identification to authenticate the client computer prior to sending the second FTR.

11. The method of claim 7, further comprising:
    sending a chronological transaction history to the input device to modify the chronological transaction history.

12. A computer program product comprising a computer readable medium having computer readable program instructions embodied thereon, the computer readable program instructions configured to control a client computer to perform a plurality of steps to manage financial transactions, the plurality of steps comprising:
    storing store a financial profile associated with a financial application on the client computer, wherein the financial profile comprises a plurality of financial accounts;
    sending, from the client computer, a parameter including a list of the plurality of financial accounts to a web server for use in generating a replica of the financial profile, wherein the financial profile stored on the client computer exists prior to the replica;
    sending a copy of a first financial transaction record (FTR) comprising a first timestamp from the client computer to the web server after sending the parameter, wherein the first timestamp records an occurrence of a first financial transaction, and wherein the first FTR is stored on the web server before the copy of the first FTR is sent from the client computer to the web server;

receiving, from the web server, a second FTR comprising a second timestamp and identifying a financial account selected from the plurality of financial accounts in response to sending the first FTR, wherein the second FTR is generated using financial transaction information sent to the web server from an input device, and wherein the financial transaction information is sent to the web server before the first FTR is sent to the web server from the client computer;

adding the second FTR to the financial account of the financial application on the client computer, wherein the input device is separate from the client computer, wherein the second timestamp records an occurrence of a second financial transaction at the input device, and wherein the first timestamp precedes the second timestamp.

13. The computer program product of claim 12, the plurality of steps further comprising:

receiving a profile identification from the web server after sending the parameter; and using the profile identification for automatic recognition of the client computer to the web server prior to receiving the second FTR.

14. A computer readable medium having computer readable program instructions embodied thereon, the computer readable program instructions configured to control a web server to perform a plurality of steps to manage financial transactions, the plurality of steps comprising:

receiving, at the web server and from a client computer executing a financial application, a parameter comprising a list of a plurality of financial accounts associated with a financial profile of the financial application;

generating, at the web server, a replica of the financial profile using the parameter, wherein the financial profile on the client computer exists prior to the replica;

receiving, at the web server, financial transaction information from an input device, wherein the input device is separate from the client computer;

receiving, at the web server, a copy of a first financial transaction record (FTR) comprising a first timestamp from the client computer after receiving the financial transaction information from the input device, wherein the first timestamp records an occurrence of a first financial transaction, and wherein the first FTR is stored on the web server before receiving the copy of the first FTR from the client computer;

generating, at the web server, a second FTR using the financial transaction information, wherein the second FTR comprises a second timestamp and identifying a financial account selected from the plurality of financial accounts, and wherein the second timestamp records an occurrence of a second financial transaction at the input device; and sending the second FTR from the web server to the client computer in response to receiving the first FTR, wherein the first timestamp precedes the second timestamp, and wherein the second FTR is added to the financial account of the financial application on the client computer.

15. The computer program product of claim 14, the plurality of steps further comprising:

generating a check sum of the list of the plurality of accounts;

receiving a new list from the client computer; and comparing the check sum of the list of the plurality of accounts with a check sum of the new list prior to sending the second FTR.

16. A system for managing transactions comprising:

a first financial transaction record (FTR) comprising a first timestamp, wherein the first timestamp records an occurrence of a first financial transaction;

a second FTR comprising a second timestamp and identifying a financial account, wherein the second timestamp records an occurrence of a second financial transaction;

a client computer storing a copy of the first FTR and executing a financial application comprising a profile, wherein the financial profile is constructed based on a parameter including a list of a plurality of financial accounts, and wherein the client computer is configured to add the second FTR to the financial account of the financial application;

a web server operatively connected to the client computer and configured to receive the first FTR from the client computer, send the second FTR to the client computer in response to receiving the first FTR, and generate a replica of the financial application profile using the parameter after receiving the parameter from the client computer, wherein the financial application profile stored on the client computer exists prior to the replica, and wherein the first FTR is stored on the web server before the copy of the first FTR is received from the client computer; and an input device separate from the client computer, operatively connected to the web server, and configured to transmit financial transaction information to the web server based on the replica, wherein the second FTR is generated using the financial transaction information, wherein the second financial transaction occurs at the input device, and wherein the first timestamp predates the second timestamp.

17. The system of claim 16, wherein the input device comprises a third-party web page.

* * * * *

UNITED STATES PATENT AND TRADEMARK OFFICE
CERTIFICATE OF CORRECTION

| | | |
|---|---|---|
| PATENT NO. | : 7,729,959 B1 | Page 1 of 1 |
| APPLICATION NO. | : 10/105602 | |
| DATED | : June 1, 2010 | |
| INVENTOR(S) | : Michael L. Wells et al. | |

It is certified that error appears in the above-identified patent and that said Letters Patent is hereby corrected as shown below:

In claim 12, column 18 (line 55), the word "store" should be deleted.

Signed and Sealed this

Seventeenth Day of August, 2010

David J. Kappos
*Director of the United States Patent and Trademark Office*